DALTON & STEVENS.
Bee Hive.
No. 7,258.
Patented April 9, 1850.
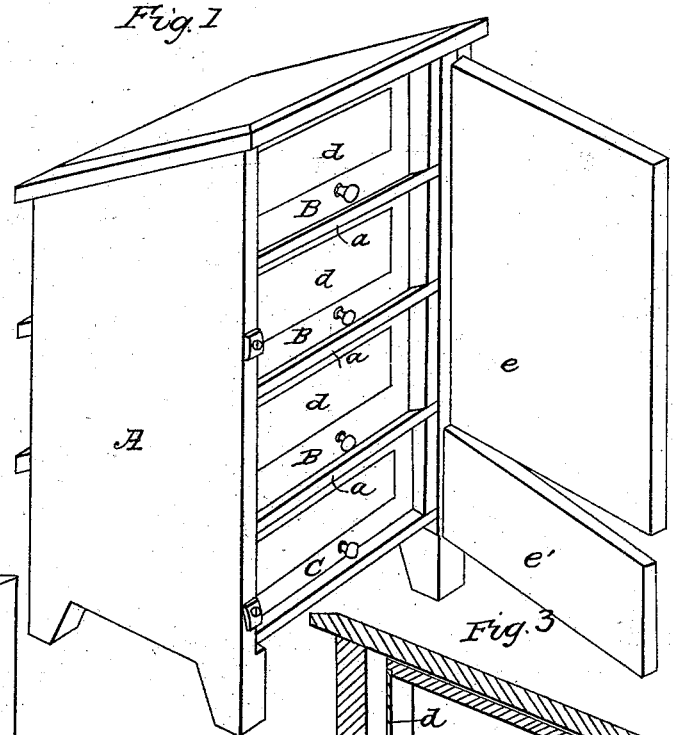
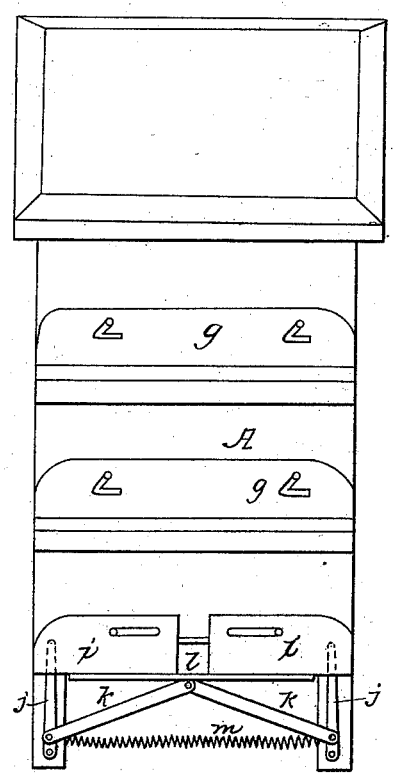
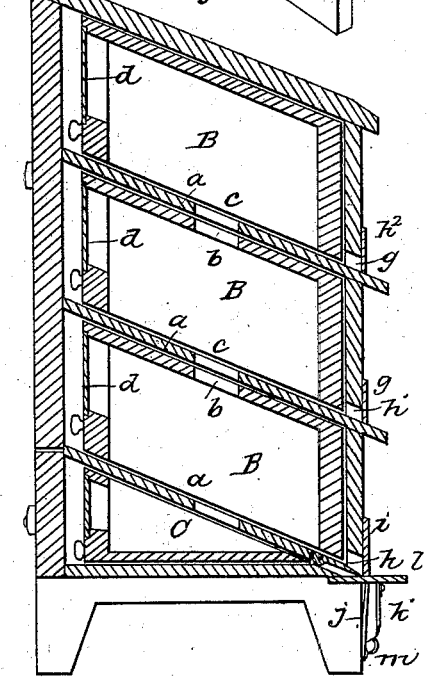

UNITED STATES PATENT OFFICE.

JOHN E. DALTON AND THOMAS STEVENS, OF NEW VIENNA, OHIO.

ENTRANCE TO BEEHIVES.

Specification of Letters Patent No. 7,258, dated April 9, 1850.

*To all whom it may concern:*

Be it known that we, JOHN E. DALTON and THOMAS STEVENS, of New Vienna, in the county of Clinton and State of Ohio, have invented certain new and useful Improvements in Beehives, of which the following is a full, clear, and exact description, reference being had to the accompanying drawing, which forms part of this specification, and in which—

Figure 1 represents a view in perspective of our hive, with the back toward the spectator and the doors open; Fig. 2 is an elevation of the front of the hive, and Fig. 3 a vertical section through its center from front to back.

Our hive is of that class denominated alternating, and is so constructed that the bees may be made to work downward or upward at will, while at the same time it affords a convenient means for feeding the bees, and for dividing swarms; it is also so arranged that the size of the door through which the bees enter and leave the hive is made larger or smaller according to the number of bees passing, their weight acting upon the ledge on which they alight to produce this effect.

In the drawing A is the outer case of the hive divided into several stages, or tiers by inclined shelves $a$, $a$, $a$, between which drawers B are inserted; the form of the latter is shown by their section at Fig. 3, each is open at the bottom, and perforated at the top $b$, to allow the bees to pass from one drawer to the other through a corresponding opening $c$ made in the shelves. A small tray C is inserted in the space between the lowest inclined shelf and the bottom of the case, this serves to feed the bees when necessary. A pane of glass $d$ is fitted into the back of each drawer, to facilitate the inspection of the hives. The back of the case is closed by a door composed of two leaves $e$, $e'$, the upper ($e$) extending the whole height of the three drawers B, B, B, and the lower ($e'$) covering only the back of the tray C, which is also furnished with a pane of glass.

Each drawer is furnished with a separate means of ingress and egress $h$, $h'$, $h^2$, at the front of the case the upper ones of which may be closed by sliding shutters $g$, $g$, or by an arrangement of self adjusting doors represented in the accompanying drawing as applied to the lowest drawer alone. This is constructed in the following manner: Two sliding doors $i$, $i$, are fitted to the opening, these are each operated by an upright lever $j$, $j$, hinged at its lower extremity to the front of the case, the two levers are connected by a pair of toggle jointed levers $k$, $k$, hinged at their outer extremities to the upright levers $j$, $j$, and supporting the front of the door ledge $l$ upon their bent toggle joint.

The ledge $l$ is hinged at its hinder edge to the hive and its front edge is free to turn downward being supported by the toggle joint of the levers alone, hence the weight of the bees on the ledge, will depress its front edge, which acting through the toggle jointed levers $l$, $l$, upon the upright levers $j$, $j$, will force the sliding doors apart from each other, and thus increase the width of the opening between them; as the weight upon the ledge is diminished by the passage of a less number of bees, the doors are drawn toward each other by a spring $m$ connecting the two upright levers. It will be perceived that the distance to which the doors separate is governed by the varying weight of the bees upon the ledge and by the rigidity of the spring, which last must be of such strength that while it gives to the weight of the passing bees, it will on the other hand, when the number of bees passing is diminished draw the doors together, and thus proportionately diminish the size of the opening.

This hive is peculiarly adapted to enable the bees to withstand the attacks of the mothmiller, as it is well known that when the opening to a hive is well guarded, the millers can not effect an entrance; it will be seen that in our hive the opening is at all times exactly proportioned to the number of bees passing and repassing, widening when necessary to enable them to enter and depart with facility, but contracting again sufficiently to be easily guarded when a small number of bees are passing to and fro. The hive also affords an easy means of dividing swarms by the withdrawal of one or two of the drawers and replacing them by empty ones; it also enables the beemaster to work the bees upward or downward at pleasure, as the lower openings of the hive can be closed and the upper ones left open, the bees are then forced to build in the upper drawers.

When a swarm requires feeding, the honey or syrup is placed in the tray beneath the lower shelf, and the lower leaf of the door is opened, the bees, being then attracted by the light shining through the pane of glass in the back of the tray, descend and feed themselves. In some cases beemasters may prefer to divide the upper drawer vertically into two drawers of half the size, to enable them to take a smaller portion of honey from the hive at a time.

What we claim as our invention and desire to secure by Letters Patent, is—

The devices for opening and closing the entrance of the bee-house in the manner set forth.

JOHN E. DALTON.
THOMAS STEVENS.

Witnesses:
 JOHN MATTHEWS,
 H. B. HIXSON.